Dec. 14, 1965  A. M. GRASS  3,222,755
METHOD OF ASSEMBLING AN ELECTRODE
Filed Aug. 2, 1961
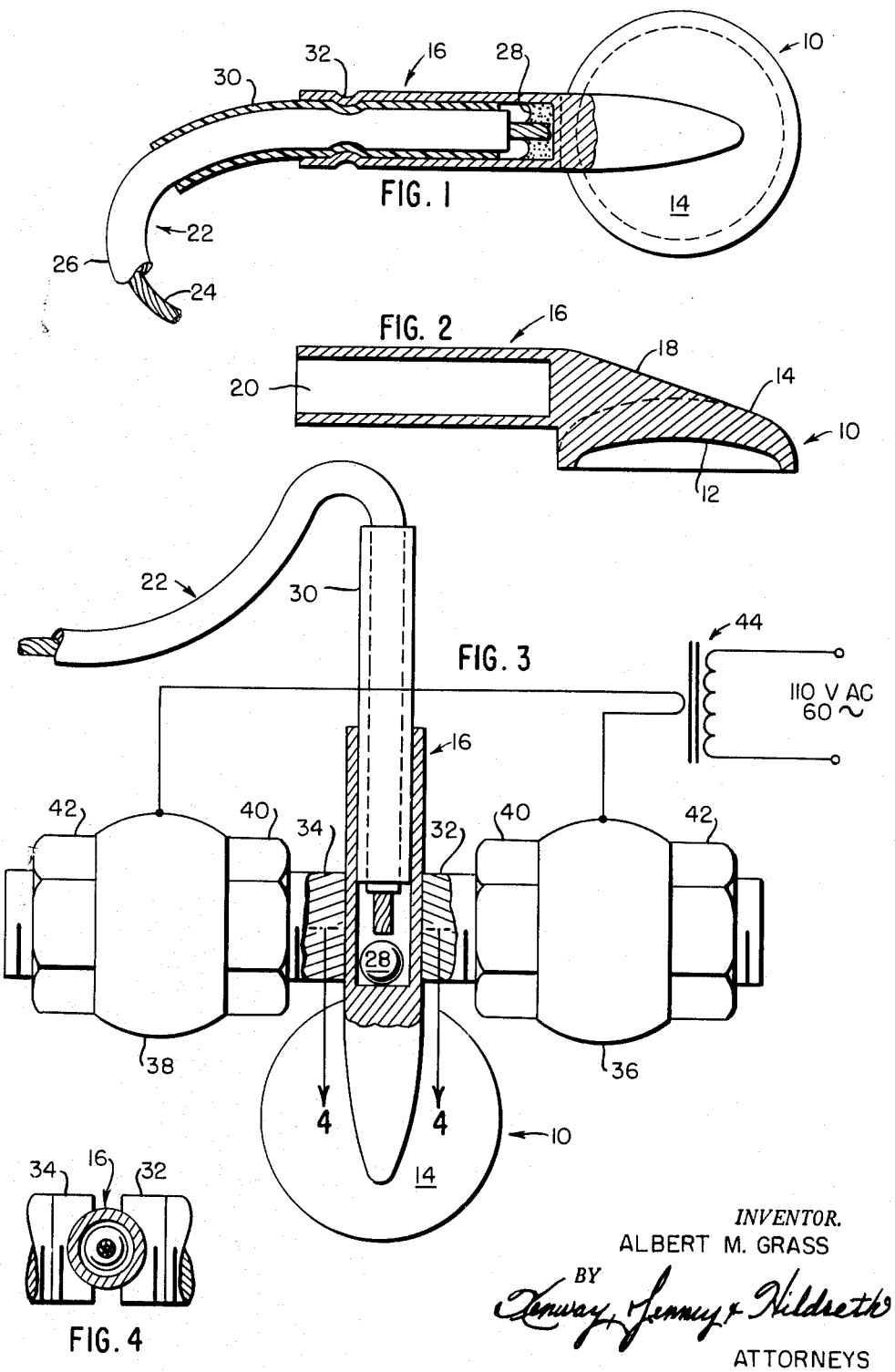
INVENTOR.
ALBERT M. GRASS
BY
ATTORNEYS

3,222,755
METHOD OF ASSEMBLING AN ELECTRODE
Albert M. Grass, 77 Reservoir Road, Quincy, Mass.
Filed Aug. 2, 1961, Ser. No. 128,746
1 Claim. (Cl. 29—155.5)

This invention relates to a novel and improved electrode assembly for use in electroencephalographic procedures.

In electroencephalographic procedures, an electrode is embedded in an electrolyte which is applied to the subject. The electrode assembly further includes a wire connected to the electrode at one end and having means at the remote end for connection to an electroencephalograph. The electrolyte usually employed is a putty or gelatin-like substance which adheres well to the skin. In prior art electrode assemblies, the electrode usually consisted of a disc of silver to which is soldered the connecting wire. The silver electrode is usually coated with rhodium. This structure exposes a silver-rhodium-tin-copper-lead (assuming the connecting wire to be copper) combination to electrolytic action when the assembled electrode is embedded in an electrolyte and connected to the electroencephalograph. As a result, corrosion takes place at the juncture of the metals causing spurious signals to be developed. Such spurious signals have long been a problem in electroencephalographic testing. Additionally, there is often the problem of fracture of the connecting wire particularly when the flexible wire is bent adjacent the point of soldering to the electrode. Also, of course, there is the problem of fracturing of parting the connection of the wire and electrode when a force is exerted longitudinally on the wire.

Accordingly, it is the object of this invention to provide a method of making a novel and improved electrode assembly and the like for use in electroencephalographic procedures whereby spurious signals due to electrolytic action, such as described above, will be eliminated.

It is another object of this invention to provide a method of making a novel and improved electrode assembly and the like of the type described in the preceding object whereby strain relief will be provided to eliminate fracturing of the connecting wire due to bending or longitudinal force.

It is a further object of this invention to provide a novel and improved method of assembling an electrode assembly and the like for electroencephalographic purposes.

Other objects and advantages will be in part obvious and in part apparent from the following.

Briefly, and in one aspect thereof, this invention contemplates an electrode for electroencephalographic use which comprises a body of silver in the form of a cup-shaped disc with a shank extending integrally from the body and provided with a recess extending inwardly from the outer end of the shank. An insulated flexible wire extends into the recess of the shank with the inner end of the wire being soldered to the shank at the bottom of the recess. A Teflon (tetrafluorethylene polymer) sleeve surrounds the insulated portion of the wire disposed within the shank and extends a substantial distance beyond the free end of the shank. The shank is deformed radially inwardly of the Teflon tube to engage the same firmly and provide a liquid seal at a point spaced outwardly of the shank from the soldered connection. In this manner, it is not possible for the electrolyte to come into contact with the multi-metal connection of the wire and shank, and thus spurious signals due to electrolytic action are eliminated. Further, the extension of the Teflon sleeve beyond the free end of the shank provides a strain relief with regard to bending of the wire. Also, the engagement of the shank and Teflon sleeve provides a strain relief with respect to outward displacement of the wire relative to the shank. This, as well as other aspects of the invention, will be more fully explained in the following detailed description when taken in connection with the accompanying drawing in which:

FIG 1 is a plan view, partly in section, of an electrode assembly constructed in accordance with this invention;

FIG. 2 is a longitudinal cross sectional view of the electrode of FIG. 1;

FIG. 3 is an elevational view illustrating apparatus for use in assembling the electrode of FIG. 1; and FIG. 4 is a cross sectional view taken substantially along the line 4—4 of FIG. 3.

With reference to the drawing, and particularly to FIGS. 1 and 2, an electrode assembly of this invention comprises a silver electrode having a body portion generally indicated at 10. The body 10 is generally disc shaped, being circular in plan, and has a concave bottom surface 12 and a convex top surface 14. The concave bottom surface of the body provides a recess in which may be received a small amount of electrolyte during use of the electrode. The electrode is a die pressed part and further comprises a shank generally indicated at 16 which is integral with the body and extends generally radially from the top surface thereof. The shank is merged into the body section by a portion 18. The shank 16 is further provided with the recess extending from the free end thereof remote from the body 10. The recess 20 extends only partially through the shank and terminates just short of the juncture portion 18. The recess 20 provides the majority of the shank 16 with a tubular configuration.

One end of a flexible insulated wire 22 extends within the recess 20 for the purpose of electrically connecting the electrode to an electroencephalographic apparatus. The wire 22 comprises a core 24 of multi-filamented copper and an insulation covering 26. In the preferred embodiment, the insulation 26 is vinyl. However, a rubber insulation could be used. The insulation 26 is stripped from the inner end of the wire 22 to expose the core. The exposed end of the core is electrically connected to the bottom portion of the recess 20 by solder indicated at 28. Surrounding the insulated portion of the wire within the shank 16 is a sleeve 30 preferably fabricated of Teflon. The sleeve 30 extends beyond the free end of the shank a substantial distance and preferably at least equal to twice the outer diameter of the wire 22.

The shank is deformed radially inwardly as at 32 to provide a firm compressive engagement with the sleeve 30 and between the sleeve 30 and the insulation 26 of the wire 22. This deformation of the shank may be accomplished by crimping the shank about its periphery and should be done at a point spaced outwardly from the soldered connection of the core 24 and shank 16. The crimping of the shank 16 provides a liquid tight seal between the Teflon sleeve and shank and between the Teflon sleeve and insulation 26. Accordingly, it is not possible for electrolyte to enter the shank and come into contact with the soldered connection within the shank. In this manner, spurious signals due to electrolytic action are eliminated. The Teflon sleeve is preferably thin in order that it will provide easy flexing. When the wire 22 is flexed, the portion of the Teflon sleeve extending beyond the free end of the shank will reinforce the wire and prevent a sharp bend at the free end of the shank which could cause fracture of the wire. The sleeve should be thin walled to preserve flexibility, and for example, in a specific embodiment, the sleeve had a .060″ outer diameter with a wall thickness of .005". Further, the Teflon sleeve helps distribute the gripping force over the insulation so as not to cause fracture of the insulation of the wire therewithin. Also, the crimping of the shank over the Teflon sleeve provides a mechanical connection of the wire 22 and shank at this point and thus provides a strain relief with regard to movement of the wire 22 outwardly of the shank.

It will be understood that the electrode of this invention is quite small in size. For example, in a specific embodiment, the body 10 is approximately ¼" in diameter with the shank being approximately .080" outer diameter and approximately ¼" long, with respect to the portion thereof extending beyond the body 10. The soldering of the wire 22 to a structure of such small dimensions presents some difficulty. There will now be described an improved method for assembling the electrode assembly. With reference to FIGS. 3 and 4, the method of this invention comprises, first, locating an electrode in a vertical position with the shank extending upwardly and engaged between a pair of contacts or electrodes 32, 34. In the specific embodiment shown in FIGS. 3 and 4, the contacts 32, 34 are stainless steel studs threaded into elongated copper bars 36 and 38. The contacts 32 and 34 are locked on the bars 36 and 38 by a pair of lock nuts 40, 42 threaded over the contacts and engaged on opposite sides of the bars 36 and 38. The ends of the stainless steel studs 32 and 34 which engage the opposite sides of the shank are, as shown in FIG. 4, shaped to conform generally to the peripheral shape of the shank so as to provide a broad surface contact with the shank. The contacts 32 and 34 are engaged with the shank with a relatively high force to provide surface pressures on the order of 1000 p.s.i. These high contact pressures are required in order to maintain a low resistance at the surfaces of contact. As in a specific embodiment of the apparatus used in this method, these pressures may be obtained by fixing the bar 38 and moving the bar 36 toward the bar 38 with sufficient force to achieve the desired pressure. More specifically, the bars 36 and 38 being elongated and somewhat flexible, the bar 38 may be backed by suitable means, such as a block to fix the same, and the bar 36 may be moved by a toggle mechanism in order easily to achieve the high force required.

The bars 36 and 38 are connected to a single turn secondary transformer 44 supplied with 60 cycle 110 v. alternating current. With the electrode shank clamped between the contacts 32 and 34 as shown, the solder 28 in the form of a pellet or the like is dropped into the recess 20 in the shank so that it bottoms in the recess. The electrical circuit is then energized to provide resistance heating of the shank in the area of the solder thus causing melting of the solder. It is preferred that resin core solder be used. After energizing the circuit for one or two seconds to assure that the solder is melted, the wire 22 is inserted into the recess in the shank to insert the inner end of the wire into the solder. Prior to inserting the wire in the shank, the insulation of the wire is removed at one end to bare the inner conductors 24. Also, prior to insertion of the conductor into the shank, the Teflon sleeve 30 is assembled onto the wire. After the bared end of the wire has been inserted into the solder and sufficient time has elapsed for the solder to harden, the electrode assembly is removed from between the contacts 32 and 34. Subsequently, the shank is crimped about its periphery as at 32 in FIG. 1 for the purpose described above.

The use of stainless steel for the contacts 32 and 34 is necessary in order to provide the contacts with low thermal conductivity while at the same time low electrical resistance. In this manner, heat will not be conducted away from the electrode during the resistance heating thereof and further the low resistance of the contacts and the high pressure engagement with the shank assures that the silver shank will be the primary resistance in the circuit so as to achieve fast heating of the shank. Also, the Teflon sleeve 30 which is disposed between the shank and the insulation 26 on the wire will withstand the heat of soldering better than the usual wire insulation and thus will protect the wire 22 during the soldering operation. An important advantage gained by the use of stainless steel for the contacts 32, 34 is that during the heating of the shank there will be no transfer of elements of the contacts to the silver shank. It is essential that such transfer of material be avoided in order to assure that only one metal, the silver, will be exposed to electrolyte during use of the electrode assembly. This is in keeping with the object of eliminating spurious signals caused by exposure of dissimilar metals to the electrolyte.

Inasmuch as changes and variations could be made in the above construction and method and different embodiments of this invention could be made without departing from the scope thereof, it is intended that all matter contained in the above description or shown in the accompanying drawing shall be interpreted as illustrative and not in a limiting sense.

It is also to be understood that the language in the following claim is intended to cover all of the generic and specific features of the invention herein described and all statements of the scope of the invention which, as a matter of language, might be said to fall therebetween.

I claim:

A method of assembling an electroencephalographic electrode and the like of the type having a tubular shank portion provided with a recess extending inwardly from one end thereof, comprising the steps of locating a pellet of solder in the bottom of said recess, engaging opposite sides of the shank with electrical contacts, said electrical contacts being fabricated from stainless steel shaped to conform to the engaged surfaces of the shank and having a relatively low resistance to electrical current and a relatively low thermal conductivity, providing a force on the contacts in a direction radially of the shank to achieve a high pressure contact engagement at the surfaces of engagement between the contact and the shank, passing an electrical current through the electrical contacts and the shank to heat the shank in the area of the solder, assembling a sleeve of high-temperature-resistant plastic over a first end of the insulated wire, inserting the first end of the insulated wire into the shank and engaging said end of the wire with the melted solder, said sleeve having a length sufficient so that after the wire is inserted into the shank and engaged with the solder the sleeve will extend beyond the free end of the shank a substantial distance, shutting off the current to allow the solder to solidify, said solidified solder providing the electrical connection between said wire and the shank, and deforming said shank into a liquid type sealing engagement with said sleeve.

References Cited by the Examiner

UNITED STATES PATENTS

| | | | |
|---|---|---|---|
| 1,565,321 | 12/1925 | Frantz | 339—102 |
| 2,250,156 | 7/1941 | Ferguson | 219—85 |
| 2,324,809 | 7/1943 | Abbott et al. | 219—85 |
| 2,397,052 | 3/1946 | Schietinger | 219—85 |
| 2,782,786 | 2/1957 | Krasno | 128—417 |
| 2,895,479 | 7/1959 | Lloyd | 128—417 |
| 3,035,583 | 5/1962 | Hirsch et al. | 128—418 X |
| 3,104,277 | 9/1963 | Bossu | 174—77 X |

RICHARD A. GAUDET, *Primary Examiner.*